Nov. 24, 1953
C. D. JELLISON
2,660,197
PLUG
Filed July 28, 1950
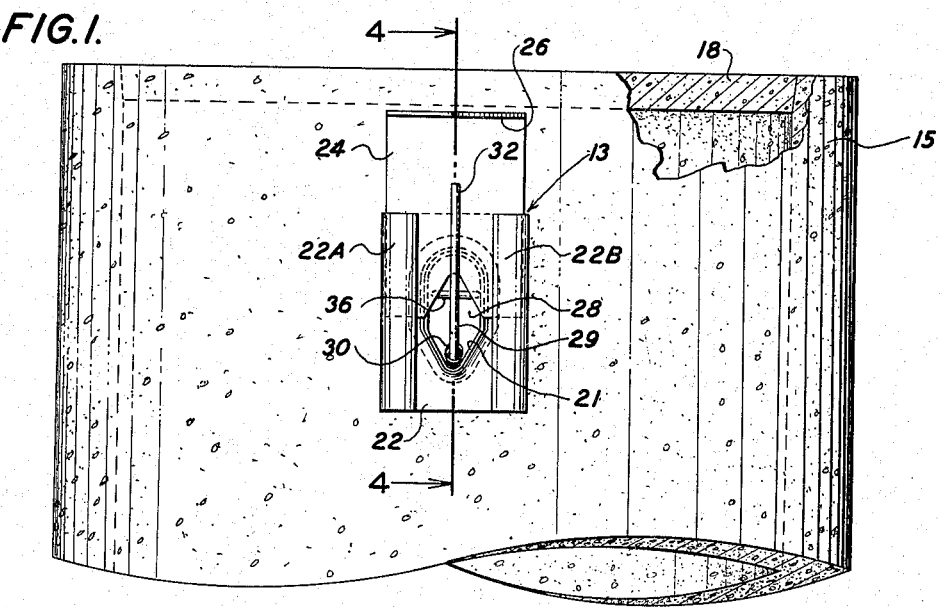
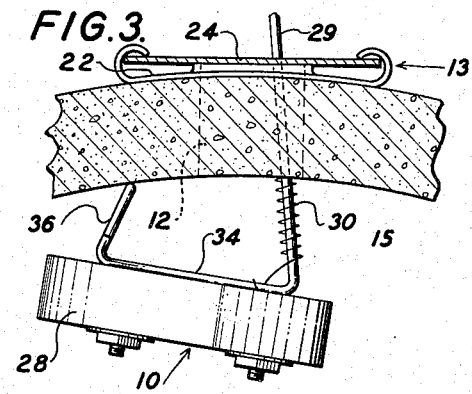
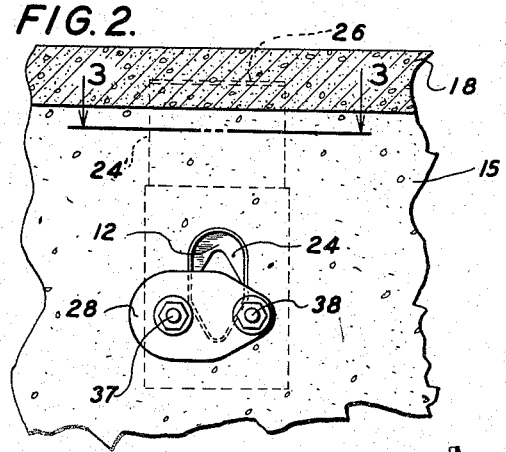
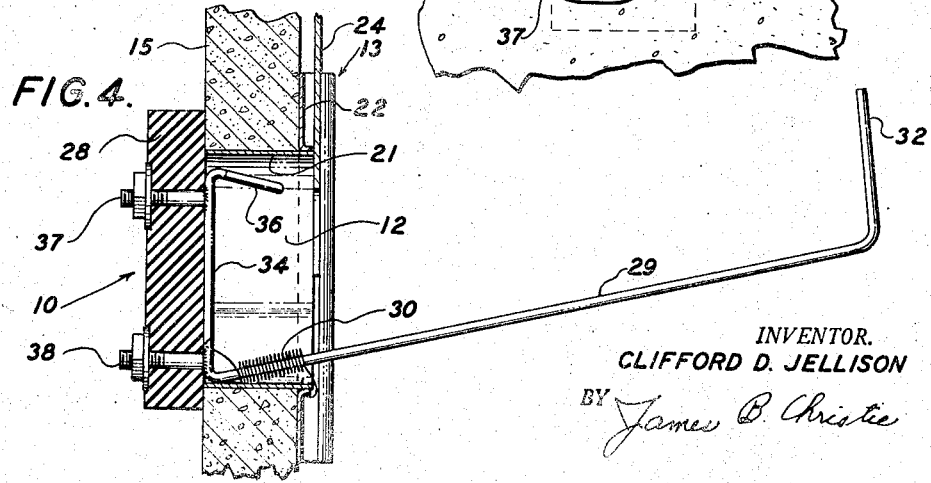
INVENTOR.
CLIFFORD D. JELLISON
BY *James B. Christie*
ATTORNEY Patented Nov. 24, 1953

2,660,197

UNITED STATES PATENT OFFICE 2,660,197

PLUG

Clifford D. Jellison, Upland, Calif.

Application July 28, 1950, Serial No. 176,364

7 Claims. (Cl. 137—735)

This invention relates to irrigation and particularly to plugs adapted to seal orifices in irrigation conduits.

In irrigation it is customary to run a pipeline along high ground, for example in a citrus grove, and to discharge water from the pipeline into ditches running transverse to the pipeline. Sometimes the pipelines are provided with risers placed at intervals along the line and these risers are provided with gates through which the irrigation water flows out. The gates are adjustable and are set accurately to assure the proper distribution of water into the several ditches. Frequently it is desirable to shut off the water flow through one or more gates without disturbing the settings of these gates, which are carefully made and time consuming. Moreover, the gates, even when completely shut, tend to leak.

I have developed a plug which will seal off the flow through an irrigation gate without disturbing the gate setting. The plug is so constructed that it can be inserted through an orifice of a gate from the outside and hence is adapted for installation in existing gate structures. These gate structures frequently are disposed in irrigation conduits that are completely closed, save for the orifice itself. In other words, the plug of the invention is adapted to be installed through the orifice with which it is to be used.

The plug of the invention is simple, rugged and inexpensive to construct and is positive in its action. The plug of my invention comprises a handle or shaft having a soft relatively thick block of elastic material, such as sponge rubber, fastened on one end of the handle. The block is of such resilience and size that it can be inserted through the orifice of the irrigation gate, after which it will expand and cover the inside of the orifice. Means, such as a spring, are provided for holding the resilient block tight against the inside wall through which the orifice projects, thus forming a seal. When flow is desired through the gate, the plug is pushed in by means of the handle, operating against the spring, and by slight rotation of the handle on its axis a stop provided on the plug contacts the inside wall of the conduit and holds the block free from the orifice.

In my preferred device, I provide a sponge rubber block slightly larger than the orifice which it is intended to seal. Mounted on the front of the block is a handle extending transversely of the major surface of the block. A coil tension spring is wound around the handle adjacent the block and is provided with a hook on its outside end which may be fastened to the outside of the gate or conduit. A projection or stop is formed on the handle and by twisting the handle after pushing the plug in against the spring action, the stop may be brought into contact with the inside wall of the conduit to hold the block from the orifice of the gate.

These and other aspects of the invention will be understood more thoroughly in the light of the following description taken in conjunction with the accompanying drawing in which:

Fig. 1 is a fragmentary front elevation of a riser with its orifice closed by a presently preferred form of the plug of the invention;

Fig. 2 is a fragmentary inside elevation of the riser of Fig. 1 showing the plug of Fig. 1 in an open position;

Fig. 3 is a horizontal section of the riser taken along line 3—3 of Fig. 2; and

Fig. 4 is a vertical section of the riser and plug taken along line 4—4 of Fig. 1.

The plug 10 of the invention is shown in Figs. 1 and 4 closing an orifice 12 of an irrigation gate 13 in a cylindrical concrete riser 15 of the type commonly used in citrus orchards. The riser illustrated has a relatively thick wall and is permanently closed at its top by a concrete disc 18. With the plug in the position illustrated in Figs. 2 and 3, water escapes through the orifice into an irrigation ditch in amounts depending upon the setting of the gate.

The irrigation gate consists of a sleeve 21 of the same cross section as the orifice, a rectangular front plate 22 having a centrally placed hole of the same size and shape as the orifice, and a rectangular sliding panel 24. The sleeve fits snugly in the orifice with one end flush with the inner wall of the riser and with its other end projecting slightly beyond the outer wall of the riser through the hole of the plate 22. The sliding panel, whose inner face rides on the projecting end of the sleeve, is slidably held in position by longitudinal tracks 22A, 22B formed along the edges of plate 22. The upper end of the panel is bent outward, forming a projection 26 acting as a limit stop and a grip to facilitate adjustment of the panel position. The panel as illustrated has an inverted V notch cut into its lower edge.

The plug consists of a soft, sponge rubber block 28 larger in cross section than the orifice but of the same general shape, a handle 29 affixed to and extending from one face of the block, and a tension coil spring 30 wound around the handie. The outer end of the handle is bent to form a grip 32. A portion 34 of the handle adjoining its inner end is bent to lie against the face of the block which is affixed thereto. The inner end of the handle is bent outward from the block and looped in a plane to form a stop 36. The stop with the plug in its closed position (Figs. 1 and 4) lies within the orifice and in the open position (Figs. 2 and 3) it engages the inner wall of the riser and spaces the block from the wall and orifice. The rubber block is fastened to the portion 34 of the handle by two spaced studs 37, 38 which pass through the block. The inner end of the coil spring is anchored to the portion 34 and the outer end of the spring is provided with a hook for engaging the outer edge of the orifice sleeve. This spring which is under tension at all times, urges the rubber block towards the wall.

To open the orifice the handle of the plug is pushed inward and twisted in either direction to move the stop away from the orifice. Upon release of the handle, the coil spring pulls the stop against the inner wall of the riser holding the block away from the orifice. To close the gate, the handle is again pushed inwardly, moving the stop away from the wall. The handle is then turned until the stop is aligned with the orifice. In the closed position, the spring together with the water head holds the rubber block against the wall over the orifice, effectively sealing the gate and preventing leakage.

As mentioned at the outset, frequently in irrigating an orchard it is necessary to close an irrigation gate for a short time. In the installations now commonly used this means that the setting of the gate must be disturbed as the panel which controls the amount of water flowing through the orifice is also used to close the gate. With the use of the plug of the invention, the gate may be closed without disturbing the panel setting and hence eliminating the necessity of readjustment at each use. This results in a large saving of time, there being a large number of irrigation gates in the average orchard.

The plug of the invention, by reason of the fact that the plugging element is resilient in nature, may be forced through an orifice of smaller dimensions. This feature permits the use of the plug of the invention with existing risers and other closed irrigation conduits. Preferably, the resilient block has the same general shape as the orifice to facilitate insertion of the block through the orifice from the outside.

I claim:

1. In a plug for an irrigation gate having an orifice extending through the wall of a conduit, the combination which comprises a resilient block of relatively soft material having a cross section larger than that of the orifice and adapted to be pushed therethrough from the outside of the conduit, a handle fastened to and extending transversely of the block and longer than the orifice, means for holding the block tightly against the inside wall of the conduit around the mouth of the orifice and a stop fastened to and extending transversely to the handle near the block for engaging the inside wall of the conduit when the handle is turned on its axis.

2. In a plug for an irrigation gate having an orifice extending through the wall of a conduit, the combination which comprises a resilient block of corresponding shape and of larger cross section than the orifice and adapted to be pushed through the orifice from the outside of the conduit, a handle fastened to and extending transversely of the block and longer than the orifice, means for holding the block tightly against the inside wall of the conduit around the mouth of the orifice, a stop fastened to and extending transversely to the handle near the block for engaging the inside wall of the conduit when the handle is turned on its axis, and means for turning the handle on its axis.

3. In a plug for an irrigation gate having an orifice extending through the wall of a conduit, the combination which comprises a resilient block having a cross section larger than that of the orifice and adapted to be pushed therethrough from the outside of the conduit, a handle fastened to and extending transversely of the block and longer than the orifice, a spring for holding the block tightly against the inside wall of the conduit around the mouth of the orifice, a stop fastened to and extending transversely to the handle near the block for engaging the inside wall of the conduit when the handle is turned on its axis, and means for turning the handle on its axis.

4. In a plug for an irrigation gate having an orifice extending through the wall of a conduit, the combination which comprises a resilient block of relatively soft material having a cross section larger than that of the orifice and adapted to be pushed therethrough from the outside of the conduit, a handle fastened to and extending transversely of the block and longer than the orifice, a coil spring with one of its ends anchored to the plug and the other end removably anchored to the conduit, a stop mounted to one side of the handle near the block for engaging the inside wall of the conduit when the plug is pushed into the conduit beyond its inside wall and the handle is turned on its axis, and means for turning the handle on its axis.

5. In a plug for an irrigation gate having an orifice extending through the wall of a conduit, the combination which comprises a resilient block of relatively soft material having a cross section larger than that of the orifice and adapted to be pushed therethrough from the outside of the conduit, a handle fastened to and extending transversely of the block and longer than the orifice with the outer end of the handle spaced from the conduit bent to form a grip, means for holding the block tightly against the inside wall of the conduit around the mouth of the orifice, and a stop mounted to one side of the handle near the block so that it engages the inside wall of the conduit when the grip is moved to turn the handle on its axis.

6. In a plug for an irrigation gate having an orifice extending through the wall of a conduit, the combination which comprises a resilient block of relatively soft material having a cross section larger than that of the orifice and of similar shape and adapted to be pushed therethrough from the outside of the conduit, a handle fastened to and extending transversely of the block and longer than the orifice, a stop for holding the block away from the wall, said stop being disposed to one side of the handle near the block so that it will engage the inside wall of the conduit when the block is pushed into the conduit beyond its inside wall and the handle is turned on its axis, a coil tension spring wound around and anchored at one end to the handle, means for fastening the other end of the spring to the conduit, and means for turning the handle on its axis.

7. In a plug for an irrigation gate having an orifice extending through the wall of a conduit, the combination which comprises a resilient block of relatively soft material having a cross section larger than that of the orifice and of similar shape and adapted to be pushed therethrough from the outside of the conduit, a handle fastened to and extending transversely of the block and longer than the orifice, a stop for holding the block away from the inside wall of the conduit, a coil tension spring anchored at one end to the handle and removably anchored at the opposite end to the conduit and holding the block against the inner wall of the conduit when the stop is not operative.

CLIFFORD D. JELLISON.

References Cited in the file of this patent

UNITED STATES PATENTS

| Number | Name | Date |
|---|---|---|
| 494,455 | Barkhaus | Mar. 28, 1893 |
| 1,068,349 | Lane | July 22, 1913 |
| 1,264,690 | Shanks | Apr. 30, 1918 |
| 1,554,377 | Sette | Sept. 22, 1925 |
| 2,154,255 | Williams | Apr. 11, 1939 |
| 2,226,310 | Kaehler | Dec. 24, 1940 |
| 2,240,129 | Broecker | Apr. 29, 1941 |
| 2,278,899 | Schorer | Apr. 17, 1942 |
| 2,288,954 | Reid | July 7, 1942 |
| 2,373,620 | Vischer | Apr. 10, 1945 |